US008221239B2

(12) United States Patent
Ryan

(10) Patent No.: US 8,221,239 B2
(45) Date of Patent: Jul. 17, 2012

(54) REMOTE AUTHENTICATION FOR GAMING APPLICATIONS

(75) Inventor: Chad A. Ryan, Henderson, NV (US)

(73) Assignee: WMS Gaming Inc., Waukegan, IL (US)

( * ) Notice: Subject to any disclaimer, the term of this patent is extended or adjusted under 35 U.S.C. 154(b) by 1433 days.

(21) Appl. No.: 11/575,922

(22) PCT Filed: Sep. 14, 2005

(86) PCT No.: PCT/US2005/033058
§ 371 (c)(1), (2), (4) Date: Mar. 23, 2007

(87) PCT Pub. No.: WO2006/036589
PCT Pub. Date: Apr. 6, 2006

(65) Prior Publication Data

US 2007/0298887 A1 Dec. 27, 2007

Related U.S. Application Data

(60) Provisional application No. 60/613,797, filed on Sep. 28, 2004.

(51) Int. Cl.
*A63F 9/24* (2006.01)
*A63F 13/00* (2006.01)
*G06F 17/00* (2006.01)
*G06F 19/00* (2006.01)

(52) U.S. Cl. ........................................................ 463/42

(58) Field of Classification Search ..................... 463/42
See application file for complete search history.

(56) References Cited

U.S. PATENT DOCUMENTS

| | | | | |
|---|---|---|---|---|
| 5,454,000 | A | 9/1995 | Dorfman | |
| 5,643,086 | A * | 7/1997 | Alcorn et al. | 463/29 |
| 5,768,382 | A * | 6/1998 | Schneier et al. | 380/251 |
| 6,434,151 | B1 | 8/2002 | Caves et al. | |
| 2002/0049909 | A1 | 4/2002 | Jackson et al. | |
| 2004/0259633 | A1 * | 12/2004 | Gentles et al. | 463/29 |

OTHER PUBLICATIONS

"International Search Report for Application No. PCT/US2005/033058, date mailed May 2, 2006", 4 pgs.
"Written Opinion of the International Searching Authority for Application No. PCT/US2005/033058, date mailed May 2, 2006", 6 pgs.

* cited by examiner

*Primary Examiner* — David L Lewis
*Assistant Examiner* — Reginald Renwick
(74) *Attorney, Agent, or Firm* — Schwegman, Lundberg & Woessner, P.A.

(57) ABSTRACT

Techniques for authenticating gaming applications are presented. Authentication requests are periodically and regularly sent by a requestor to a gaming device for purposes of authenticating configurable portions of a gaming application. The gaming device generates results which are transmitted back to the requestor. The requestor compares the results against known results to determine if the configurable portions are authenticated or not authenticated.

14 Claims, 4 Drawing Sheets

REMOTE AUTHENTICATION FOR GAMING APPLICATIONS

RELATED APPLICATION

This application is a U.S. National Stage Filing under 35 U.S.C. 371 from International Patent Application Serial No. PCT/US2005/033058, filed Sep. 14, 2005, and published on Apr. 6, 2006 as WO 2006/036589 A2, and republished on Apr. 6, 2006 as WO 2006/036589 A3, which claims the priority benefit of U.S. Provisional application Ser. No. 60/613,797, filed Sep. 28, 2004, the contents of which are incorporated herein by reference.

FIELD

The field of the invention relates to authentication and in particular to remote authentication of gaming applications over a network.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND INFORMATION

Gaming establishments and vendors continue to address growth in the gaming industry with automation. For example, it is now common for gaming devices to be connected to remote processing sites for purposes of automated management and control of the gaming devices.

Networking gaming devices to remote processing sites does present a variety of challenges. For instance, gaming applications associated with betting games, which execute on the gaming devices, can become infected or corrupted causing gaming applications to malfunction or to become inoperable. In some cases, corruption may result in a problem with the initial software that only surfaces when certain gaming applications' states are reached during execution. In other cases, administrators may unknowingly perform operations on the gaming applications that corrupt the software; these operations may be related to boot sequences for the gaming device, related to upgrades, related to installs, etc. In still other situations, corruption may occur by a malicious intruder that is able to penetrate the gaming network or the gaming device with a software virus.

To detect software corruption, a variety of software authentication techniques have been used by the gaming industry. For example, one popular technique uses algorithms to generate a relatively small number value for a large amount of data. This number value is generated on the gaming device for the data that represents an image of the gaming applications resident on the gaming device. The number value is then sent over the gaming network to the remote processing site where it is compared against a known and predetermined number value. If the two values (generated and known) do not match, then administrators know that the gaming applications have been tampered with or have otherwise become corrupted.

With the number value technique, processing throughput can be challenging particularly when the data that is used to generate the number value is voluminous. This is particular true with more recent gaming devices which may have storage media that houses multiple gaming applications, each of which may occupy a large portion of the media.

Consequently, when authentication is performed the gaming machine may be inoperable for extended periods of time while it is generating a number value. Moreover, authentication may be automatically performed when relatively harmless events occur, such as when the gaming machine's door is opened simply because a coin jammed. When the gaming machine is not operational, the casinos are losing potential revenue. Typically, authentication delays of 2-5 minutes may be tolerable, but with the size of modern gaming devices' media that delay can easily extend for delays over an hour.

In addition, with the number value authentication technique an intelligent software virus may be able to detect what number value is being expected by the remote processing site. As a result, even if some gaming applications are corrupted the remote processing site can be tricked into believing that no corruption exists at all.

SUMMARY OF THE INVENTION

Methods, systems, and devices are presented for remotely authenticating gaming applications over a network.

In an embodiment, an authentication request identifies a configurable portion of a gaming application which is to be authenticated. The request is periodically and regularly sent to a gaming device; in response to the request the gaming device generates a result associated with processing the configurable portion. The result is then sent to a requestor that issued the request. The requestor compares the result against a known result to determine if the configurable portion of the gaming application is authenticated or not authenticated.

DESCRIPTION OF THE EMBODIMENTS

Figure 1:
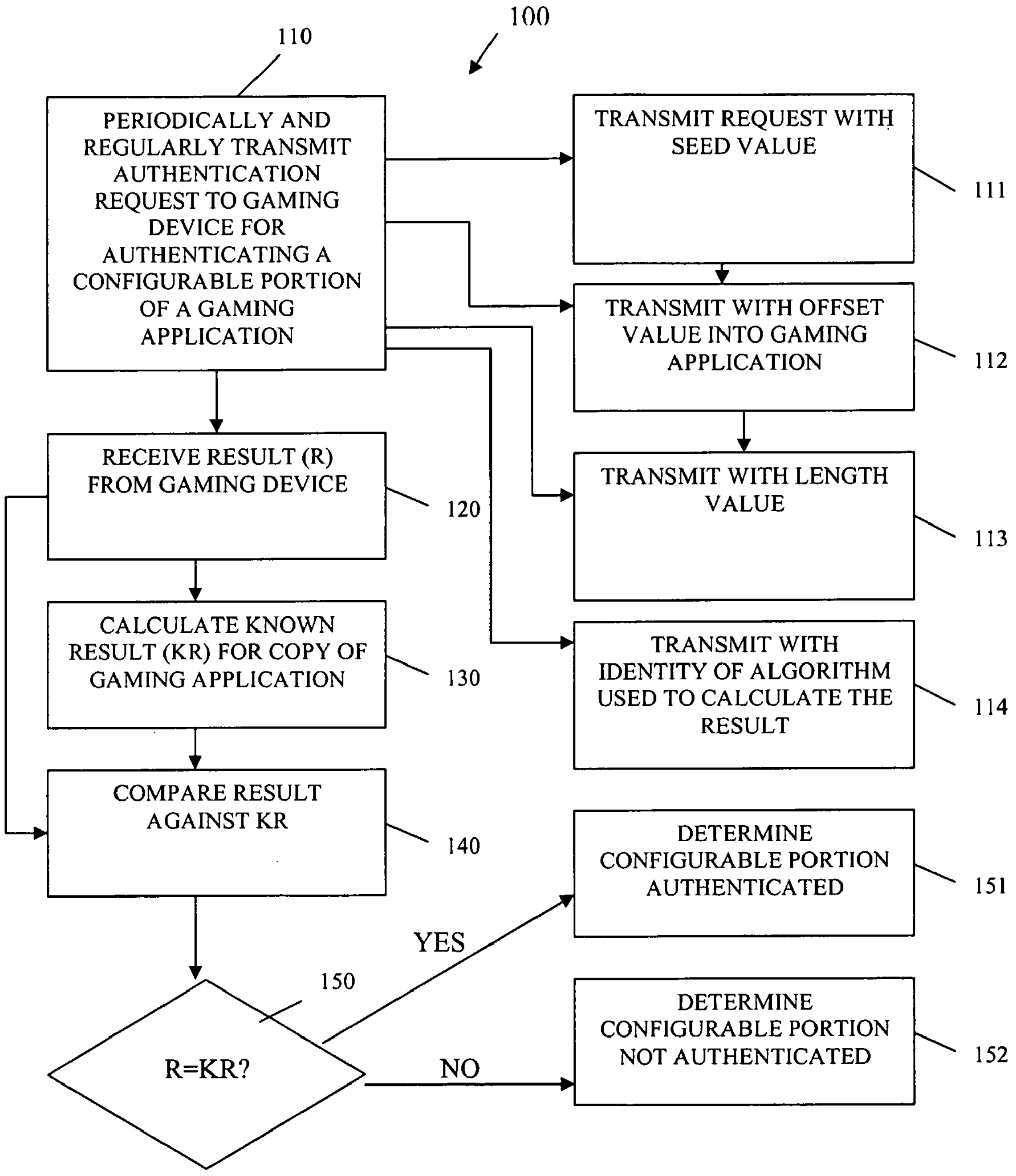
FIG. 1 is a flowchart of a method for remote authentication of a gaming application, according to an example embodiment.

FIG. 1 illustrates a flowchart of one method 100 for remote authentication of a gaming application, according to an example embodiment. The method 100 is implemented in a machine accessible medium and/or machine. However, the method 100 may be implemented in many manners, such as, and by way of example only, the method 100 may be implemented as a series of signals, as a part of a hardware implementation, combinations of hardware and/software, etc. In an embodiment, the method 100 is implemented as software instructions loaded and processed within a remote processing site. The instructions represent an authentication service that authenticates gaming applications resident on gaming machines over a network. Of course, the method 100 may be implemented in a variety of machines, software, media, and/or architectures.

As used herein a "gaming device" refers to a physical or logical machine that plays or executes games associated with betting. By way of example only, a gaming device may be a slot machine, video poker, and the like. In some instances, the gaming device may be logical meaning that the instructions represent the gaming device where those instructions are executed within a composite processing device. For example, a slot machine may be implemented as a logical gaming device as software instructions and processed within a World-Wide Web (WWW) browser where the WWW browser executes on a processing device, such as a computer, personal digital assistant (PDA), phone, and others. Moreover, a single gaming device may be capable of executing one to many betting games.

A "gaming application" is data resident on a gaming device which when executed or consumed by the gaming device results in a betting game being played on the gaming device. Thus, a gaming application may be executable instructions, electronic files, databases, and/or directories that are locally housed in media interfaced to the gaming device.

A "requester" or "requestor service" is an authentication service which processes on a remote processing site and makes authentication requests to a gaming device over a network. The requestor makes periodic and regular authentication requests to gaming devices for purposes of receiving a result or number value associated with a configurable portion of data representing the gaming applications. The result is compared by the requestor against a known or dynamically requestor-calculated result. If a match occurs, then authentication of the configurable portion is assured. Conversely, if a match does not occur, then the requestor knows some corruption to the configurable portion has occurred.

A "remote processing" site is instructions that process on a device, which is geographically dispersed from the gaming device. In other words, the remote processing site is external to gaming device and its cabinet that houses its local components. The remote processing site is networked to the gaming device. The network may be hardwired, wireless, or a combination of hardwired and wireless. Furthermore, in some instances, the network is secure, direct, and/or dedicated for communications between the gaming device and the remote processing site. A single remote processing site is capable of interfacing to a plurality of same or different gaming devices over the network. The remote processing site serves as a central management point for the gaming devices of the network.

The terms "local" and "remote" are relative meaning that for any given network transaction having two parties, a first party may have local components or features and a second party may have remote components or features relative to the first party. The designation of local and remote depends on a party's classification for any given transaction. A remote component or feature means that it is geographically dispersed from other local components of features and accessible via a network.

Initially, a gaming device and a remote processing site are interfaced to one another over a network connection. This may be achieved by installing network interface cards on both the gaming device and the remote processing site. The network interface card may support hardwired, wireless, or a combination of hardwired and wireless communications between the gaming device and the remote processing site. Furthermore, the network connection may be point-to-point serial connections such as RS-232, multi-drop RS-485 connections, Ethernet, etc.

Referring now to FIG. 1 and the method 100 (hereinafter referred to as "requestor"), at 110, the requester transmits periodic and regular authentication requests to a gaming device. The authentication requests are directed to a specific configurable portion of a gaming application resident on the gaming device. The period or regularity with which authentication requests are transmitted is configurable within the requestor. Thus, profiles associated with a gaming application may drive the period or regularity of requests or processing profiles or parameters associated with the requestor may drive the period or regularity of requests. Additionally, events reported to or manual instructions received by the requestor may also drive the period or regularity of requests.

The phrase "configurable portion" is associated with data for a single gaming application resident on the gaming device. Moreover, prior to the requestor issuing any specific authentication request, the gaming device does not know and cannot resolve what configurable portion of the data might be requested via an authentication request. In this manner, the gaming device is not capable of correctly guessing what configurable portions of a gaming application might be used for any future authentication request. At 110, the requestor identifies the configurable portion with the transmitted authentication requests. It is at this point that the gaming device becomes aware of the configurable portion to be used in authentication.

In an embodiment, the configurable portion may represent data associated with an entire single gaming application or a smaller subset of that data.

In more embodiments, at 111, the requester may include a seed value with the authentication request. The seed value is a randomly generated number that the gaming device is to use in generating a result for the authentication request. Thus, if the gaming device were capable of identifying and saving prior authentication requests for purposes of providing a valid result to the requester, the gaming device would not simply be capable of re-supplying a previously provided result, because the seed values for the requests would be different and thus the expected values for the results would be different.

In another embodiment, at 112, the requestor may include an offset value into the data associated with the gaming application. The offset value is the beginning location within the gaming application data that the requestor wants the gaming device to start with when generating a result. In some cases, the offset value may be accompanied with a length value, at 113. The length value instructs the gaming device on how much of the gaming application to use in generating the result. In other cases, the offset value may not be accompanied by a length value. In this event, the gaming device assumes that all the data that follows the offset value is to be used in generating the result. In a like manner, a length value may accompany a request without an offset value. With this situation, the gaming device assumes the beginning location within the data of the gaming application starts at the first location with the data and continues for length defined by the length value. It is also possible, that an authentication request includes a seed value, an offset value, and a length value, or various combinations thereof.

In yet another embodiment, at 114, the requestor may supply an identifier for an algorithm that it wants the gaming device to use for purposes of generating the result for the configurable portion of gaming application data. In this manner, prior to the authentication request, the gaming device will not even know what result algorithm that is going to be requested. The identifier permits the gaming device to acquire, load, and process a specific result algorithm. In some instances, the requestor may actually dynamically supply the instructions associated with a result algorithm with the authentication request and instruct the gaming device to load and process the result algorithm when generating the result. In other embodiments, the requestor may query the gaming device to determine what result algorithms are resident within the gaming device. Once identities for the result algorithms are known to the requester, the requestor may use an identifier to instruct the gaming device which of the result algorithms to use in generating an authentication result.

A result algorithm is instructions that take as input data, which may be voluminous, and generates a relatively small number value. That small number value is the result generated by the gaming device. The intent is to reduce the input data set down to a manageable value this is unique to the original input data set. Generally, if it is computationally infeasible to generate an alternative data set that would produce the same result (number value) from the input data set when using the same result algorithm, then the "small number value" (result) is considered unique. Result algorithms are readily available in the cryptology industry and may include existing algorithms or custom-developed algorithms. Some example result algorithms include cyclical redundancy checks (CRC), checksums, hash algorithms, digital signature algorithms, and other key generating algorithms.

At 120, the requestor receives results for the authentication requests that it transmitted, at 110, to the gaming device. At this point, the requestor may determine if the results indicate authentication or non authentication for the configurable portions of the gaming application. In an embodiment, at 130, the requestor calculates a known result for a result received from the gaming device. That is, the known or expected result may not have been determined by the requestor prior to receiving the result from the gaming device. Alternatively, the requester may calculate the known or expected result before issuing an authentication request or while an authentication request is pending. In still other alternative embodiments, the requestor may have predetermined the known or expected results and have them available for comparison against results received from the gaming device. In calculating the known results, same parameters which were used in generating the results on the gaming device are used in generating the known results.

In an embodiment, the requestor may not locally house a copy of the gaming application being authenticated. For example, the requestor may be aware of authenticated copies of the gaming application within the network. Thus, the requestor may use a list or issue a query to identify or locate a controlled or authenticated copy of the gaming application. Once an authenticated copy is identified or located, the requestor may enlist other services to generate the known result using the same parameters provided to the result algorithm of the gaming device with the original authentication request or the requestor may request a copy of the configurable portion of the gaming application's data and consume that configurable portion on its own to generate the known result. In this manner, the requestor may be a portable and wireless device that travels around a casino floor and randomly submits authentication requests to uncontrolled gaming devices, where other controlled gaming devices within the casino or external to the casino house controlled or authenticated versions of gaming applications. The requester interacts with the uncontrolled and controlled casino gaming devices to authenticated gaming applications executing on the uncontrolled devices.

The requestor maintains a locally available image copy of the gaming application's data within the environment of the remote processing site. This permits the requestor to generate, record, and predetermine the known or expected results using its own version or copy of the gaming application's data and the configurable portion identified with the authentication request issued to the gaming device.

Once the known or expected result is acquired, at 140, the gaming device received result is compared, at 150, against that known result. If the comparison is true, at 151, then the requestor determines or concludes that the configurable portion of gaming application data associated with an authentication request is in fact authenticated. Alternatively, if the comparison is false, then the requestor concludes that the configurable portion is corrupt in some manner.

If corruption occurs, the requestor may send notifications to appropriate administrators or may be capable of disabling the affected gaming application and removing it from the gaming device. In this latter situation, the requester may be capable of disabling the affected gaming application by taking over supervisory control or automatically initiating supervisory programs on the gaming device to disable or remove the gaming application in question.

The method 100 demonstrates how more efficient and in some instance more secure authentication of gaming application can occur within a gaming network. This is so, because various aspects of the authentication are dynamically communicated to the gaming device when desired, such that any virus on the gaming device is incapable of predetermining or feigning the authentication of a gaming application. Moreover, because single gaming applications or smaller portions of those gaming applications are being authenticated with requests, the time lag associated with authentication requests is substantially decreased over what has been achieved in the past. Thus, processing throughput for authentication is improved. Assurance of authentication can be achieved with more regular and periodic authentication requests, where each authentication request is serviced and resolved substantially faster.

Figure 2:
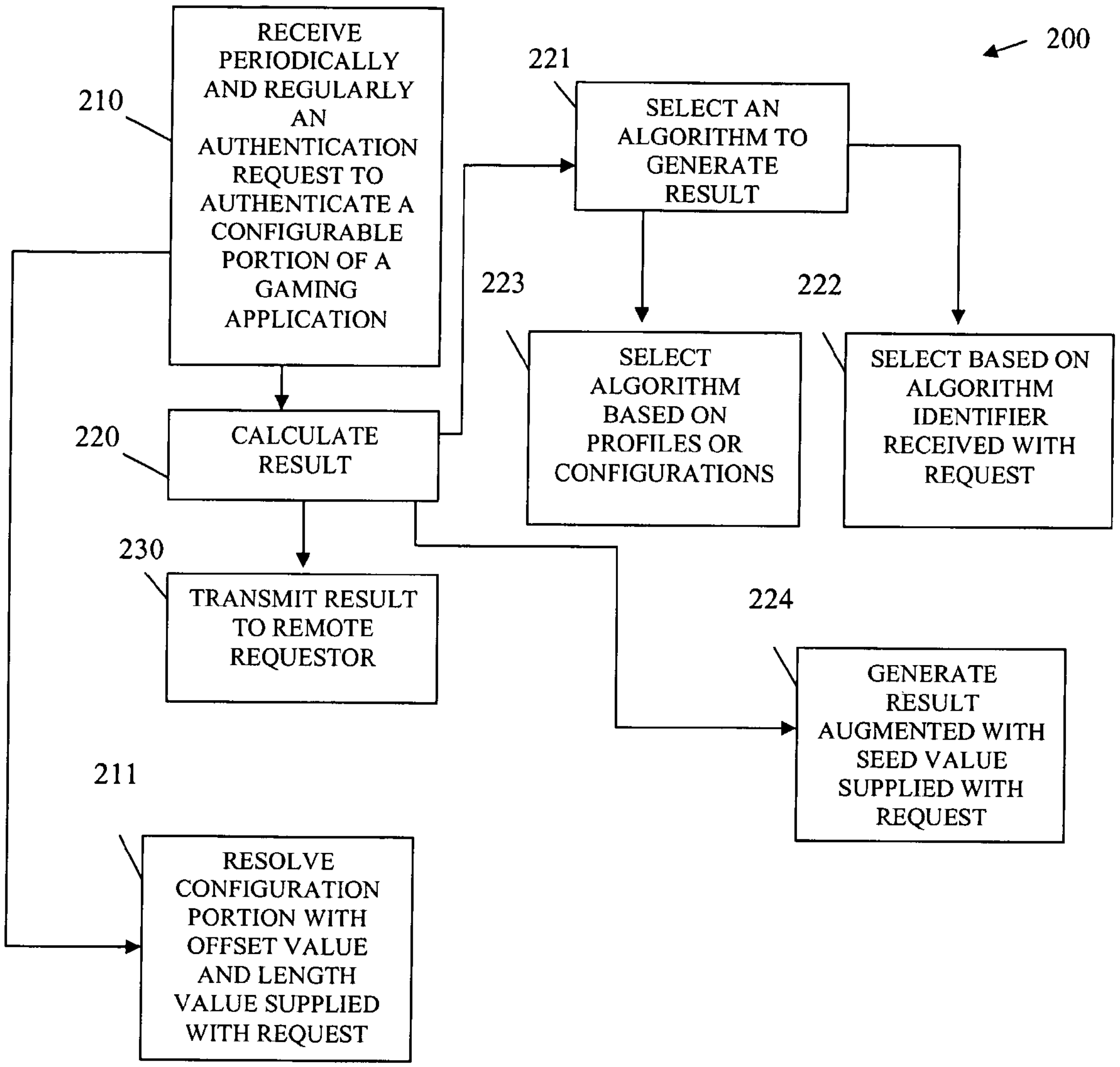
FIG. 2 is a flowchart of another method for remote authentication of a gaming application, according to an example embodiment.

FIG. 2 is a flowchart of another method 200 for remote authentication of a gaming application, according to an example embodiment. The method 200 is implemented in a machine-accessible and readable medium. In an embodiment, the method 200 depicts processing performed by software instructions executing on a gaming device, which interfaces with the processing of the method 100 (requestor) over a gaming network. The network may be hardwired, wireless, and/or a combination of hardwired and wireless.

At 210, the method 200 receives periodic and regular authentication requests from a requestor over a network. The authentication request is associated with authenticating a configurable portion of a gaming application resident on a gaming device.

In response to the authentication request, the method 200 resolves the configurable portion of data that is to be associated with satisfying the authentication request. Satisfaction is achieved by transmitting back to the requester a result generated from the configurable portion of data. In an embodiment, at 211, the configurable portion of the data may be resolved in combination with other values that the requester provides with the authentication request, such as an offset value and/or a length value (described above with respect to FIG. 1).

Next, at 220, the method calculates a result for the configurable portion of data. A result algorithm is used to generate or calculate the result. The result algorithm takes the configurable portion of data as input and supplies a result represented as a number. In some instances, the result algorithm may also take other input such as a seed value supplied with the authentication request, a private key associated with a gaming device or gaming application, a public key associated with the requestor, digital certificates, etc.

In an embodiment, at 221, a specific result algorithm may be selected by the method 200. That is, a plurality of result algorithms may be resident on the gaming machine. Some result algorithms may be used for some gaming applications and other result algorithms may be used for other gaming applications. Thus, at 222, a result algorithm may be identified by the method 200 in response to an identifier supplied with the received authentication request. Alternatively, at 223, the method 200 may identify a result algorithm based on profiles or configurations associated with either the method 200 or the gaming application associated with the configurable portion of data being authenticated.

In still other alternative embodiments, the instructions associated with the result algorithm may be dynamically acquired and installed on the gaming device from either the requestor or another service or site identified by the requestor.

Again, as described above, at 224, and in an embodiment, the authentication request may be accompanied with a randomly generated seed value supplied by the requester. The seed value is consumed as input to the result algorithm and assist in generate the result.

At 230, the calculated or generated result associated with the configurable portion of a gaming application's data is transmitted back to the remote requestor. At this point, the method 200 may await a confirmation from the requester indicating that the authentication was a success, or the requestor may assume a success occurred if not further contacted by the requester. In some embodiments, the method 200 may be enabled to assist the requester in removing or disabling the gaming application, which was the subject of the authentication request, if the result is not authenticated by the requestor.

Figure 3:
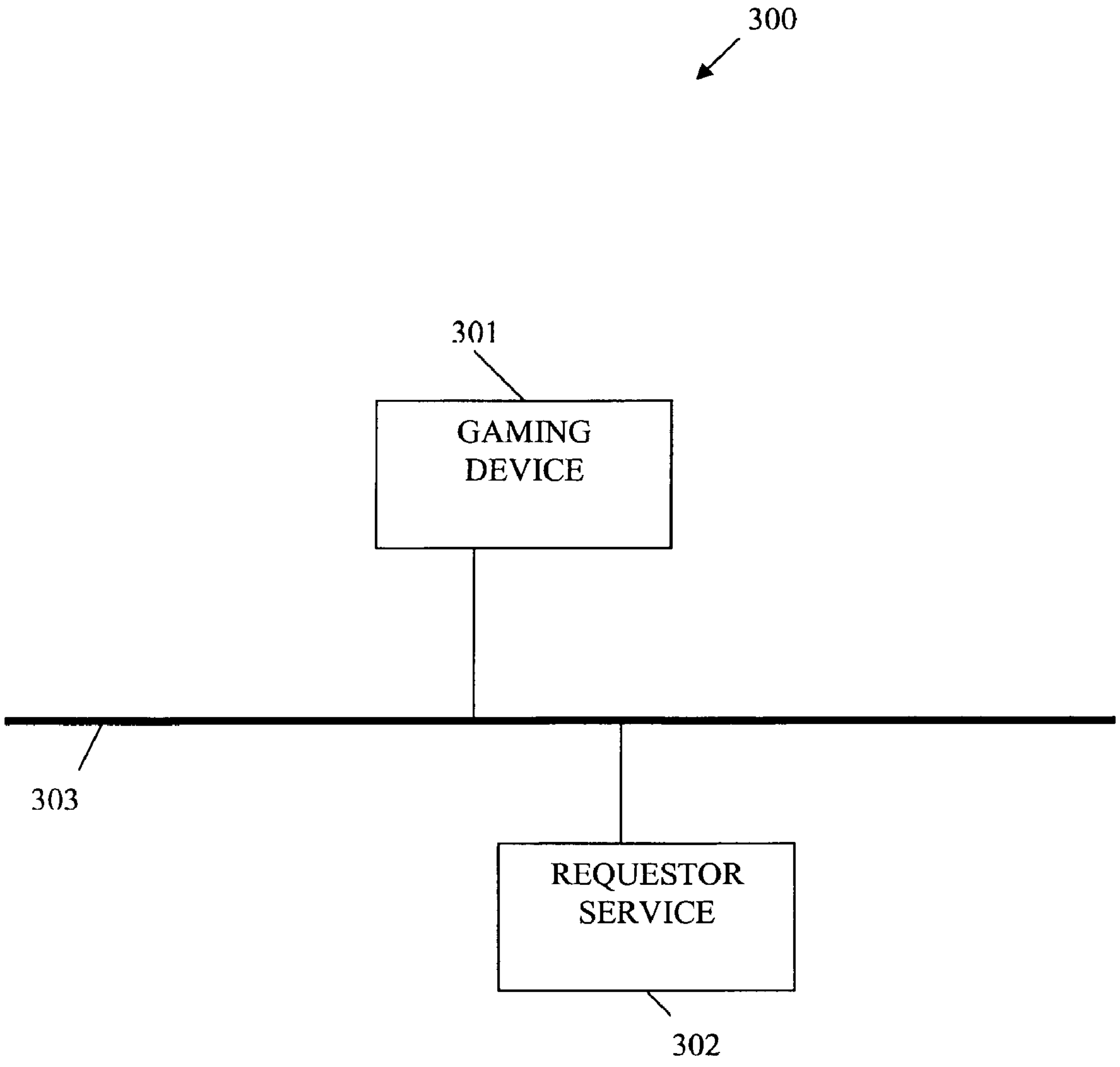
FIG. 3 is a diagram of a remote gaming authentication system, according to an example embodiment.

FIG. 3 is a diagram of a remote gaming authentication system 300, according to an example embodiment. The remote gaming authentication system 300 is implemented in a machine-accessible and readable medium. In an embodiment, various components of the remote gaming authentication system 300 implement the processing of the methods 100 and 200 of FIGS. 1 and 2.

The remote gaming authentication system 300 includes a gaming device 301 and a requestor service 302. The gaming device 301 and the requestor service 302 are interfaced with one another over a network 303. The network 303 may be hardwired, wireless, and/or combinations of hardwired and wireless. Additionally, the network 303 may be secure and/or dedicated. Alternatively, the network 303 may be insecure, such as the Internet, where communications occur in a secure manner, such as through Secure Sockets Layer (SSL) communications or through Virtual Private Network (VPN) communications.

The gaming device 301 is adapted to process a gaming application and a result algorithm. Moreover, the gaming device 301 is adapted to interface to media that includes the data associated with the gaming application. The media may be permanent media or removable media interfaced to the gaming device 301. Thus, the media may be logical partitions of hard disks, individual electronic files, individual directories, a track on a compact disk (CD), etc. The gaming device 301 may also have multiple components that can be authenticated by the requestor service 302, such that the requestor service 302 uses queries or other interfaces to discover what components exists on the gaming device 301 and uses other commands (requests) to institute authentication for desired ones of the components. The result algorithm is adapted to process against all or portions of the gaming application's data for purposes of producing a result represented as a number.

The gaming device 301 may be a physical standalone machine, such as a slot machine, a video poker machine, etc. Alternatively, the gaming device 301 may be a logical machine that processes within another physical machine as instructions that control the gaming application and the gaming application's data. In this manner, the gaming device 301 may be a service or application that is capable of processing within a browser of another processing device, such as a computer, personal digital assistant, phone, etc.

The requestor service 302 is instructions that processes on a remote device or machine. The requestor service 302 is geographically dispersed from the gaming device 301 over a network 303. The requestor service 302 is adapted to periodically and/or regularly issue authentication requests to the gaming device 301 over the network 303. Furthermore, the requestor service 302 is adapted to compare results generated by a result algorithm of the gaming device 301 against known or expected results generated by or stored by the requestor service 302. Successful comparisons indicate successful authentication requests, and non successful comparisons indicate unsuccessful authentication requests.

In an embodiment, the requests may include an identity of the gaming application, an offset value into the data associated with that gaming application, a seed value adapted to be used by the result algorithm in generating the results for requests, and/or an identity for the result algorithm itself. The requests are adapted to be formed and transmitted by the requester service 302 over the network 303 to the gaming device 301.

In yet another embodiment, the frequency or period with which the requestor service 302 is adapted to issue the authentication requests is a configurable processing parameter to the requestor service 302.

In some arrangements, the requestor service 302 is adapted to generate known or expected results for the authentications requests that it issues to the gaming device 301 using a copy of the gaming application that is locally accessible to the requestor service 302. Furthermore, the requester service 302 may be adapted to terminate, disable, and/or remove a gaming application from the gaming device 301 when a particular result does not match a corresponding known result.

During operation of the remote gaming authentication system 300, authentication requests are issued by the requestor service 302 via results produced by the gaming device 301. In an embodiment, the operation of the requestor service 302 is described above with respect to method 100, and the operation of at least a portion of the gaming device 301 is described above with respect to method 200.

Figure 4:
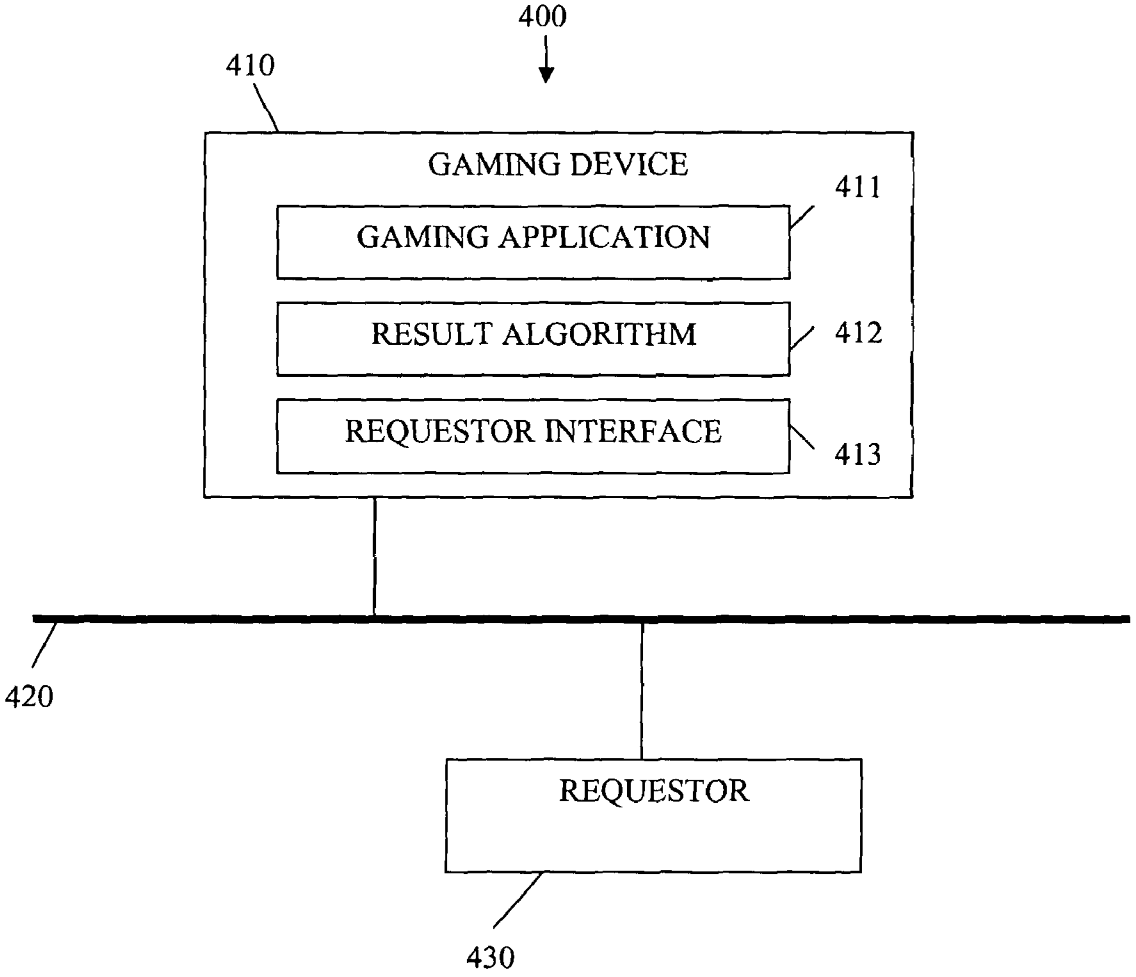
FIG. 4 is a diagram depicting a gaming device adapted to provide remote authentication information about a gaming application to a requester, according to an example embodiment.

FIG. 4 is a diagram 400 depicting a gaming device 410 adapted to provide remote authentication information about a gaming application to a requester 430, according to an example embodiment. The gaming device 410 is implemented in a machine-accessible and readable medium. In one embodiment, the gaming device 410 represents a portion of a standalone machine. In another embodiment, the gaming device 410 represents a portion of a composite processing machine. Thus, the gaming device 410 may be physical (represented by instructions and physical components, such as processors and memory) or logical (represented by just instructions).

The gaming device 410 includes a gaming application 411, a result algorithm 412, and a requestor interface 413. The gaming application 411 is respected as data on, within, or interfaced to the gaming device 410. The gaming application 411 may include instructions, databases, database tables, directories, files, etc. The gaming application 411 may reside on removable media interfaced to the gaming device 410, storage associated with the gaming device 410, and/or memory associated with the gaming device 410.

The result algorithm 412 is instructions adapted to receive data, such as all or portions of the gaming application's 411 data, and to generate a number as a result. In some situations, the result algorithm 412 may also consume or use seed values (random numbers) or keys (digital signatures, certificates, and public-private key pairs) in order to generate or calculate a particular result. In some cases, the result algorithm 412 is adapted to be dynamically supplied by the requester 430 to the gaming device 410 over a network 420. With this situation, the gaming device 410 is adapted to dynamically load and process the result algorithm 412. In other situations, the result algorithm 412 may be preloaded and installed on the gaming device 410. Additionally, the gaming device 410 may include a plurality of disparate result algorithms 412.

The requestor interface 413 is adapted to communicate with the requester 430 over a network 420 for purposes of periodically and/or regularly receiving authentication requests from the requestor 430. The authentication requests are directed to configurable portions of the gaming application's 411 data. In response to the requests, the requestor interface 413 acquires the configurable portions of data and supplies the same to the result algorithm 412. The result algorithm 412 is adapted to produce a result for the configurable portion of data (possibly using a seed value to augment the result) and supplies the result back to the requestor interface 413. The requestor interface 413 is further adapted to communicate the result as a response back to the requestor 430 over the network 420.

The requestor 430 in response to the result is adapted to determine whether the result indicates that a particular authentication request was successful or unsuccessful. In an embodiment, the requester 430 may be further adapted to confirm a successful authentication to the requestor interface 413 over the network 420 or to inform or instruct the requestor interface 413 to take some action because the authentication attempt was unsuccessful.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) in order to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention have more features than are expressly recited in each claim. Rather, as the following claims reflect, inventive subject matter may lie in less than all features of a single disclosed embodiment. Thus the following claims are hereby incorporated into the Description of the Embodiments, with each claim standing on its own as a separate exemplary embodiment.

What is claimed is:

1. A method, comprising:

transmitting, periodically and regularly, an authentication request over a network to a gaming device for authenticating a gaming application resident on the gaming device, wherein the request identifies a specific configurable portion of the gaming application that is a subset of the gaming application, and transmitting with the request a seed value for use by the gaming device in calculating the result, and transmitting with the request an offset value into storage associated with the gamming application, the offset value is a beginning portion of the gaming application to be used by the gamming application in calculating the result, and also transmitting with the request a length value that when combined with the offset value permits the gaming application to identify the configurable portion of the gaming application for use in calculating the result; and receiving a result from the gaming device over the network in response to the request, wherein the result is compared against a known value and if a match occurs, the configurable portion is considered authenticated.

2. The method of claim 1 further comprising, calculating the known result based on a copy of the gaming application, wherein the copy is locally accessible to the method and wherein same parameters are used in calculating the known result as were used in calculating the result.

3. The method of claim 1 further comprising, calculating the known result by identifying an authenticated copy of the gaming application over the network and requesting that a service supply the known result for the configurable portion.

4. The method of claim 1 further comprising, calculating the known result by identifying an authenticated copy of the gaming application over the network and requesting that a copy of the configurable portion be supplied for purposes of generating the known result.

5. The method of claim 1 further comprising, calculating the known result by locating an authenticated copy of the gaming application over the network and requesting that a copy of the configurable portion be supplied to a service that generates the known result.

6. The method of claim 1 further comprising, transmitting to the gaming application an identity for an algorithm which permits the gaming device to process the algorithm using the configurable portion of the gaming application in order to generate the result.

7. The method of claim 1, wherein transmitting further includes receiving a period for transmitting the authentication request from a requestor.

8. The method of claim 1, wherein transmitting further includes receiving a period for transmitting the authentication request from a profile for the gaming application.

9. The method of claim 1, wherein transmitting further includes receiving a period for transmitting the authentication request from parameters.

10. The method of claim 1 further comprising, processing the method on a portable and wireless device that issues the authentication request while traveling around a casino.

11. The method of claim 1, wherein receiving further includes acquiring the result as one of: a cyclical redundancy check value, a checksum value, a digital signature, and a hash sum value.

12. The method of claim 1 further comprising, sending notifications to one or more administrators when the match does not occur to disable the gaming device.

13. The method of claim 1 further comprising, disabling the gaming device when the match does not occur.

14. The method of claim 1 further comprising, initiating supervisory programs on the gaming device to take over control of the gaming device when the match does not occur.

* * * * *

UNITED STATES PATENT AND TRADEMARK OFFICE

CERTIFICATE OF CORRECTION

PATENT NO. : 8,221,239 B2
APPLICATION NO. : 11/575922
DATED : July 17, 2012
INVENTOR(S) : Chad A. Ryan It is certified that error appears in the above-identified patent and that said Letters Patent is hereby corrected as shown below:

In column 2, line 34, delete “requester” and insert --requestor--, therefor

In column 2, line 60, delete “and/software” and insert --and software--, therefor In column 3, line 21, delete “requester” and insert --requestor--, therefor In column 3, line 67, delete “requester” and insert --requestor--, therefor In column 4, line 28, delete “requester” and insert --requestor--, therefor In column 4, line 34, delete “requester” and insert --requestor--, therefor In column 5, line 5, delete “requester” and insert --requestor--, therefor In column 5, line 32, delete “requester” and insert --requestor--, therefor In column 5, line 59, delete “requester” and insert --requestor--, therefor In column 6, line 14, delete “requester” and insert --requestor--, therefor In column 6, line 53, delete “requester” and insert --requestor--, therefor In column 6, line 56, delete “requester” and insert --requestor--, therefor In column 7, line 19, delete “requester” and insert --requestor--, therefor In column 7, line 25, delete “requester” and insert --requestor--, therefor In column 7, line 28, delete “requester” and insert --requestor--, therefor In column 7, line 29, delete “requester” and insert --requestor--, therefor In column 8, line 28, delete “requester” and insert --requestor--, therefor In column 8, line 38, delete “requester” and insert --requestor--, therefor In column 8, line 51, delete “requester” and insert --requestor--, therefor In column 9, line 10, delete “requester” and insert --requestor--, therefor In column 9, line 18, delete “requester” and insert --requestor--, therefor In column 9, line 34, delete “requester” and insert --requestor--, therefor Signed and Sealed this
Eighth Day of January, 2013

David J. Kappos
*Director of the United States Patent and Trademark Office*

In column 10, line 5, in Claim 1, delete “gamming” and insert --gaming--, therefor In column 10, line 7, in Claim 1, delete “gamming” and insert --gaming--, therefor